United States Patent
Biagiotti et al.

(10) Patent No.: US 8,648,869 B1
(45) Date of Patent: Feb. 11, 2014

(54) AUTOMATIC TEST INSTRUMENT FOR VIDEO GENERATION AND CAPTURE COMBINED WITH REAL-TIME IMAGE REDISPLAY METHODS

(71) Applicant: Advanced Testing Technologies, Inc., Hauppauge, NY (US)

(72) Inventors: William Biagiotti, St. James, NY (US); Peter F Britch, Miller Place, NY (US); David R Howell, Smithfield, VA (US)

(73) Assignee: Advanced Testing Technologies, Inc., Hauppauge, NY (US)

(*) Notice: Subject to any disclaimer, the term of this patent is extended or adjusted under 35 U.S.C. 154(b) by 0 days.

(21) Appl. No.: 13/764,206

(22) Filed: Feb. 11, 2013

Related U.S. Application Data

(60) Provisional application No. 61/597,877, filed on Feb. 13, 2012.

(51) Int. Cl.
*G06F 13/14* (2006.01)

(52) U.S. Cl.
USPC .......................................... 345/520

(58) Field of Classification Search
USPC .......................................... 345/520
See application file for complete search history.

(56) References Cited

U.S. PATENT DOCUMENTS

| | | |
|---|---|---|
| 4,513,318 A | 4/1985 | Wilensky et al. |
| 4,554,663 A | 11/1985 | Pham van Cang |
| 4,635,096 A | 1/1987 | Morgan |
| 4,718,018 A | 1/1988 | Sloane et al. |
| 4,736,330 A | 4/1988 | Capowski |
| 4,754,334 A | 6/1988 | Kriz et al. |
| 4,974,080 A | 11/1990 | Fritchie et al. |
| 5,003,393 A | 3/1991 | Riegel |
| 5,055,928 A | 10/1991 | Klingelhofer |
| 5,122,863 A | 6/1992 | Zortea |
| 5,274,445 A | 12/1993 | Overton et al. |
| 5,319,446 A | 6/1994 | Emmoto et al. |
| 5,710,573 A | 1/1998 | Hung et al. |
| 5,781,231 A | 7/1998 | Reynolds |
| 5,874,991 A | 2/1999 | Steinberg et al. |
| 5,920,340 A | 7/1999 | Man et al. |
| 6,396,536 B1 | 5/2002 | Howell et al. |
| 6,608,615 B1 | 8/2003 | Martins |
| 7,180,477 B2 | 2/2007 | Howell |
| 7,289,159 B1 | 10/2007 | Biagiotti et al. |
| 7,405,723 B2 | 7/2008 | Kang et al. |
| 7,495,674 B2 | 2/2009 | Biagiotti et al. |
| 7,768,533 B2 | 8/2010 | Biagiotti et al. |
| 7,978,218 B2 | 7/2011 | Biagiotti et al. |
| 8,014,968 B2 | 9/2011 | Stakely et al. |
| 8,072,494 B2 | 12/2011 | Qin et al. |
| 8,229,001 B2 | 7/2012 | Chuang |
| 8,356,282 B1 | 1/2013 | Leippe et al. |
| 2007/0115360 A1* | 5/2007 | Biagiotti et al. ............... 348/180 |

* cited by examiner

*Primary Examiner* — Hau Nguyen
(74) *Attorney, Agent, or Firm* — Brian Roffe

(57) ABSTRACT

Method of capturing multiple format video signals and reformatting them in real-time for display on generic external monitors, is disclosed. This method is intended for, by not limited to, implementation on a multiple function video test instrument with video generation and video capture capabilities. The method is capable of operating with standard and non-standard format synchronized video waveforms and also with deflection-driven video waveforms. Since this innovative method reuses already available functionality in the video test instrument, the new functionality is realized efficiently, economically and does not require any more space within the test instrument.

19 Claims, 6 Drawing Sheets

GENERAL ARRANGEMENT

GENERAL ARRANGEMENT

AUTOMATIC TEST INSTRUMENT FOR VIDEO GENERATION AND CAPTURE COMBINED WITH REAL-TIME IMAGE REDISPLAY METHODS

CROSS-REFERENCE TO RELATED APPLICATION

This application claims priority under 35 U.S.C. §119(e) of U.S. provisional patent application Ser. No. 61/597,877 filed Feb. 13, 2012, incorporated by reference herein.

FIELD OF THE INVENTION

The present invention relates to the field of automatic test equipment for testing electronic video devices, and more particularly, to automatic test equipment for generating complex, multiple format video signals and the real-time capture and analysis of complex video signals, and methods for using the automatic test equipment. Further, the present invention relates to the capture and real-time automatic reformatting of synchronized and/or deflection-driven video using a single module for viewing on a common, inexpensive external monitor or other display device, and arrangements and methods that effect such reformatting.

BACKGROUND OF THE INVENTION

Automatic test equipment for the testing and measuring of electronic signals and electronic video signals is known. The capability of video test instrumentation is mainly limited to single video types with single functions such as composite video generators or composite video acquisition instruments. Many different video technologies have proliferated in military applications in order to fulfill requirements for complex situational displays with demanding image intensities, and image update rate specifications. Common video display technologies include composite video, raster video, and stroke video, and combinations of these are typically called mixed video.

These technologies are deployed on mobile platforms, such as aircraft and tanks. Within each platform, there are two primary components of the video system, namely, the video generator and the video receiver/monitor. Correspondingly, the equipment tasked with testing a video system must supply the complementary component to the component under test. If a video generator is being analyzed, its video signals need to be captured, analyzed and possibly reviewed by the test operator (the functions usually performed by the video receiver/monitor). Conversely, if a video receiver/monitor is being analyzed, proper video signals need to be generated in order to produce an image on the display (the function usually performed by the video generator).

While there is an ongoing technological shift to remove the operator out of the testing loop by enabling more software-driven automatic measurements, there are instances where automatic measurements are not feasible or possible. In video testing, a legacy method of performing video image validation is to externally connect the video generator under test to the actual system video monitor and task the operator with manually inspecting the displayed image and make a visual pass/fail determination. The physical realities of this requirement are that there are additional demands imposed to store and maintain large, heavy, system-specific, video monitors. Furthermore, as systems age and are no longer produced, monitor replacements are simply not available.

A general system supporting the testing of the spectrum of video formats has many requirements. When fulfilled by single purpose modules, the equipment and methods necessary to fulfill these requirements become onerous and inefficient. Therefore, the inventors have recognized that there exists a need for a single device to supply the functions and methods for military video testing, including video generation, video capture and video redisplay. Such a device will ideally produce significant measurable economic and time savings.

OBJECTS AND SUMMARY OF THE INVENTION

An object of some embodiments of the present invention is to provide a new and improved system having video generation, video capture and video redisplay (reformatting) capabilities on a single instrument intended for use in automatic test equipment, and methods for configuring the single instrument to perform video generation, video capture and video redisplay, and operationally using the single instrument.

In a preferred embodiment of the invention, the method incorporates features of an automatic test instrument for multi-format video generation and capture (hereinafter referred to as a Programmable Video Generator and Analyzer or "PVGA", of the type disclosed in U.S. Pat. No. 6,396,536, incorporated by reference herein). As described therein, the PVGA consists of multiple electronic modules integrated into a single instrument supporting the generation, acquisition and processing of composite video, raster video and stroke video and all of their analog and digital variants. This invention, a novel modification to this concept, leverages the complex circuit architecture already present in the structure disclosed in the '536 patent and adds the relevant function of viewing captured video imagery in real time on an external monitor, yet still, in a preferred embodiment, contained within the single instrument concept as described in the original '536 patent.

In another embodiment of the invention, the modules supporting video acquisition and video generation exist independently and separately, such as on separate circuit cards or physically separate instruments. The method would serve as the bridge between the two modules with data streaming from the video acquisition module to the invention, and then from the invention to the video generation module.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which.

DETAILED DESCRIPTION OF PREFERRED EMBODIMENTS

Figure 6:
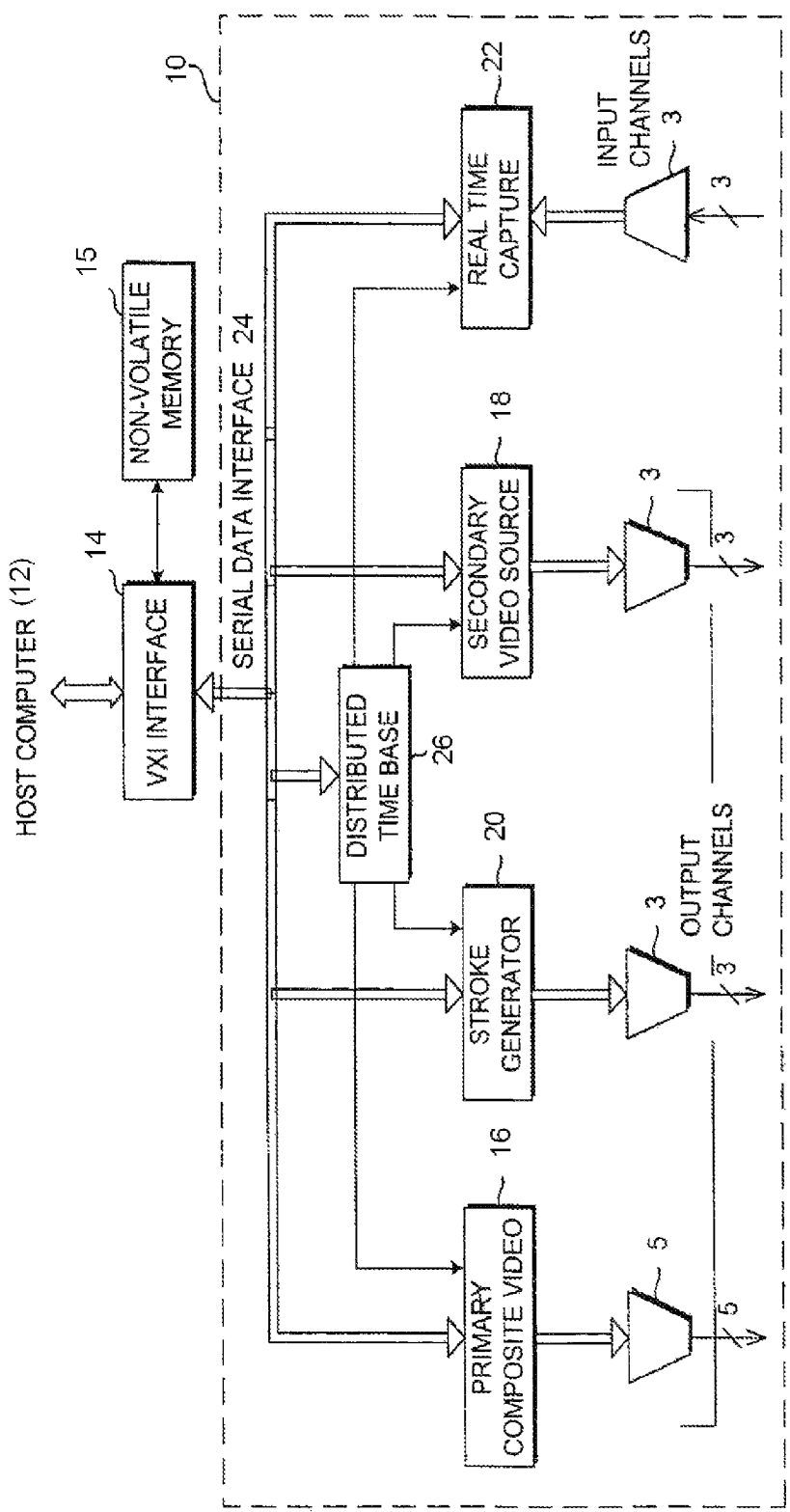
FIG. 6 shows the general arrangement of a prior art video asset disclosed in U.S. Pat. No. 6,396,536.

Important aspects of this invention are generally based on concepts described in the '536 patent mentioned above. As stated in the '536 patent, a video asset (PVGA) comprises several major elements including a primary composite video generator (PVG), stroke generator (SG), secondary video source (SVS), and real time capture (RTC), see col. 4, lines 5-8. The real time capture module already provides video data acquisition functions and makes the captured data available to external processes for analysis. More specifically, FIG. 6 herein is similar to FIG. 1 of the '536 patent and shows the general arrangement of the video asset which is designated generally as 10. A VXI Interface 14 is the interface between the video asset 10 and an automatic test equipment (ATE) host computer 12. Each of the primary elements, the primary composite video generator (PVG) 16, secondary video source (SVS) 18, stroke generator (SG) 20 and real time capture (RTC) 22, communicates with the VXI Interface 14 via the Serial Data Interface (SDI) 24. As to a distributed timebase, clock generation and distribution is the function of DTB 26. The DTB 26 includes a common high precision crystal oscillator which provides the reference frequency for a series of 4 high resolution frequency synthesizers individually dedicated to the PVG 16, SVS 18, SG 20 and RTC 22. Non-volatile memory 15 is used to store calculated timing variations for use in processing synchronized video.

Figure 1:
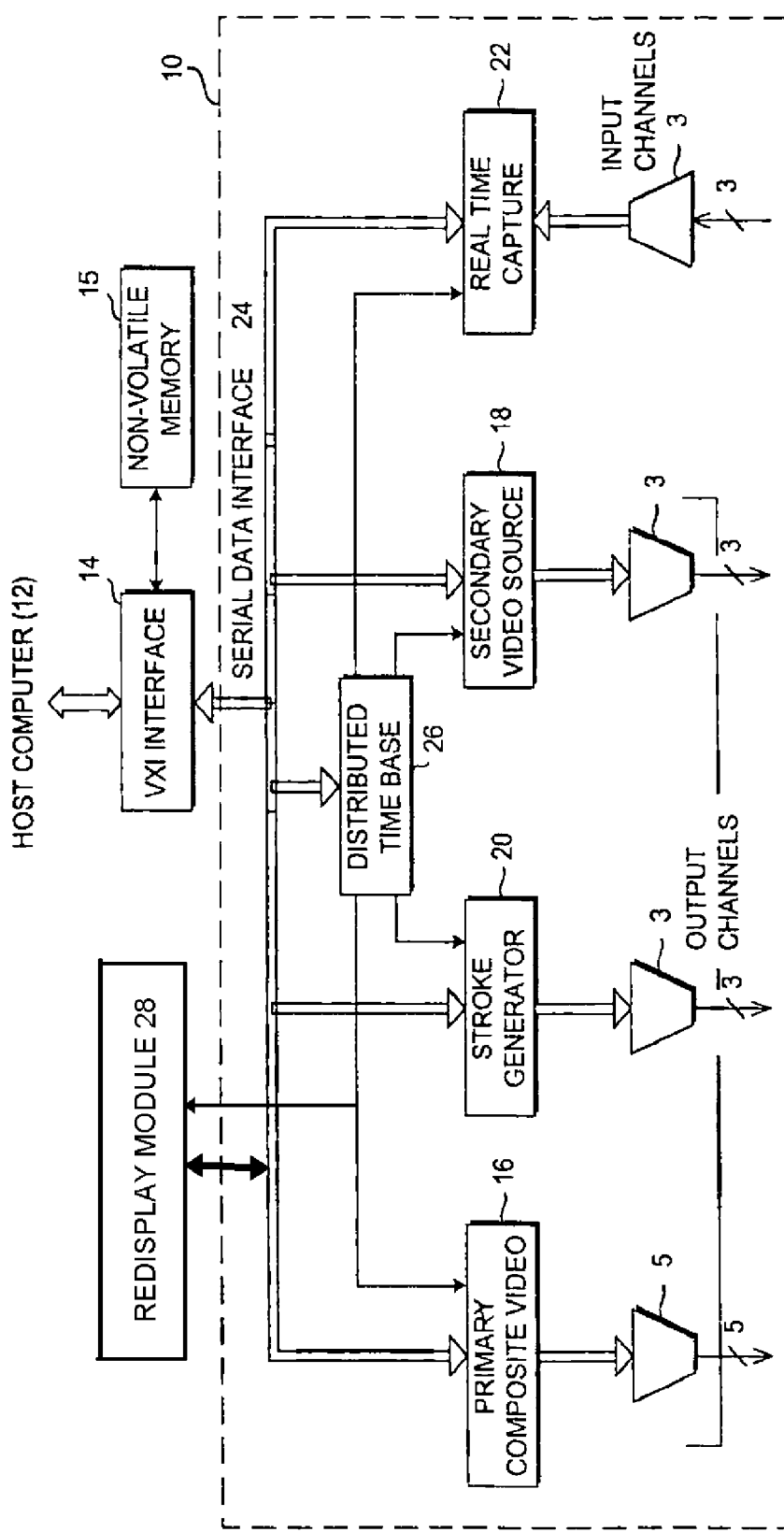
FIG. 1 shows a general arrangement of a video asset in accordance with the invention.

Referring now to FIG. 1, in an embodiment of the invention, however, there is novel use of both the captured data and the primary composite video generator 16 (often referred to in short herein as the 'PVG'), which when enabled, will stream the reformatted captured data to the primary composite video generator 16. The primary composite video generator 16 is configured and programmed to accept the video signal from a redisplay module 28 and, if required by the particular embodiment, perform color space conversion.

As shown in FIG. 1, the functional modules 16, 18, 20, 22 are together in the video asset 10, however, different combination of the functional modules 16, 18, 20, 22 can be used in other embodiments. Typically, the video asset 10 would include or communicate with a software calculation and control module SCCM to provide control over the software functions of the other elements, as well as the VXI interface 14. In this regard, if the video asset 10 is communicating with a different system, e.g., a PXI, PCI or LXI system, the interface would be adapted for these systems. Generically then, the VXI interface is a type of external communication bus utilized to program the video asset 10 and also implies the type of bus interface that is designed into the video asset 10. In addition to an interface and SCCM, one embodiment of a video asset 10 in accordance with the invention includes at a minimum, the PVG 16, the RTC 22 and the redisplay module 28. The SVS 18 and SG 20 are optional, yet preferred components, and only one may be provided or both may be included.

The redisplay video signal utilizes an output stage 30 of the PVG 16 (which has the same or substantially the same characteristics, functions and compositions as primary composite video generator module 16 as described in the '536 patent and its related applications and patents, or another those of a comparable primary composite video generator) to produce a standard VGA video signal format of the type accepted by common computer monitors. Such a monitor may be coupled to the PVG 16 but is not shown in FIG. 1. A VGA video signal format has been chosen because of its broad industry support, but the invention does not restrict itself to supporting only that family of video formats. Since the redisplay module 28 can be set to produce any video format, the selected output format could just as easily have been chosen to be another common video format. Any video format is therefore encompassed within the scope and spirit of the invention.

Figure 2:
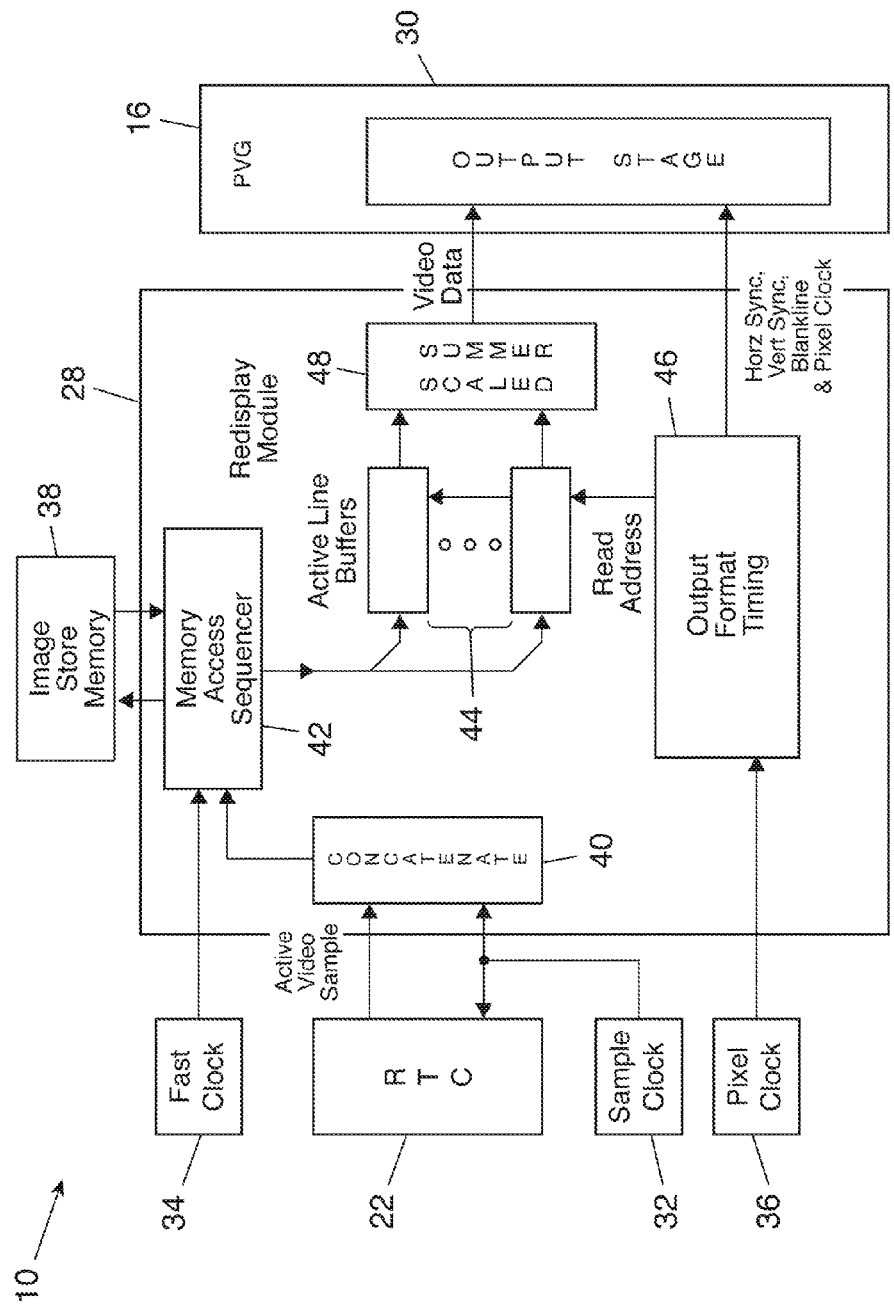
FIG. 2 illustrates a portion of a video asset in accordance with the invention with schematics showing a functional overview of a redisplay module portion of the video asset.

Referring to FIG. 2, in a video asset 10 in accordance with the invention, the innovative technique (to be known henceforth as 'the redisplay module' designated 28) resides between the real time video capture module (henceforth known as 'RTC' designated 22) and the primary composite video generator 16 and generally converts input video of an arbitrary format into a fixed format output in real-time. RTC 22 may have the same characteristics, functions and compositions as the real time capture module disclosed in the '536 patent and its related applications and patents, or those of another comparable real time capture module. The input video in an arbitrary format may comprise either synchronized formatted video, such as RS170 and RS343 compatible signals, or it may comprise deflection-based XYZ video, otherwise referred to raster video and stroke video. To accomplish this, the redisplay module 28 ideally performs, in real time, at least one and preferably all of the following:

Frame rate (frames per second) conversion;
Line rate (lines per frame) conversion; and
Pixel (pixels per line) conversion.

The output format is selected to be compatible with the external monitor selected to display the converted video. The monitor or other display device on which the output, converted video is displayed is not shown in FIG. 2. Instead of displaying the output, converted video, the video may be processed, and thus any general processing of the output, converted video is encompassed within the invention, not requiring display thereof.

Functional Overview

The processes of the RTC 22, the redisplay module 28 and the PVG 16 execute simultaneously and at three independent clock rates: the RTC Sample Clock (henceforth known as the 'Sample Clock' 32), the Redisplay Fast Clock (henceforth known as the 'Fast Clock' 34), and the Redisplay Output Pixel Clock (henceforth known as the 'Pixel Clock' 36). The sample clock 32 can be either an internal, programmable clock for analog inputs, or an external clock for digital inputs. The RTC 22 captures an input video image or images and passes active video samples thereof to the redisplay module 28 at the rate of the sample clock 32, the RTC 22 being coupled to the sample clock 32 in a usual manner, represented by an arrow in FIG. 2.

The redisplay module 28 continuously concatenates the active video samples into the largest words that an image store memory 38 can accept in a single write. Image store memory 38 is coupled to the redisplay module 28 to enable bi-directional data flow. The concatenation of the active video samples may be performed by a concatenate functionality, component or sub-module 40 in the redisplay module 28.

When the concatenated sample word achieves that length, it is loaded into an input write register of a memory access sequencer 42 (a sub-module of the redisplay module 28 and henceforth known as the 'MAS'). This action signals the MAS 42 that a write is pending. MAS 42 is the component of the redisplay module 28 that is coupled to the image store memory 38. The MAS 42 synchronizes the concatenated samples to the fast clock 34 (to which it is coupled in the usual manner), and then writes the concatenated samples to the RTC's bit-mapped image store memory 38.

The image store memory 38 is preferably organized as lines of pixels. The input video lines are stored in the image store memory 38 in the order in which they would be redisplayed on a video monitor. For instance, if the input video is of an interlaced format (i.e., RS170), the image is automatically de-interlaced and stored in the image store memory 38 as a progressive image.

The redisplay module 28 reads the stored video from the image store memory 38 via the MAS 42, and transfers data representing the stored video to a set of active video line buffers 44. At the rate of the pixel clock 36 (provided through an output format timing functionality, component or sub-module 46), the redisplay module 28, or more specifically a scaled summer 48 thereof, reads data simultaneously from the set of active video line buffers 44 and performs line averaging to achieve the same number of active lines as the selected redisplay format. Output video data from the scaled summer 48 is then provided to the output stage 30 of the PVG 16.

The redisplay module 28 also generates timing signals (Horizontal Sync, Vertical Sync and Blanking) associated with the selected output format, e.g., by the output format timing sub-module 46 of the redisplay module 28, and sends those timing signals along with the line averaged video data and the rate of the pixel clock 36 to the PVG 16. Output format timing sub-module 46 can, if desired, generate all of the necessary timing signals from the input rate of the pixel clock 36, and other inputs thereto.

PVG 16 has several modules. In a redisplay mode, an internal clock (not shown) of the PVG 16 is bypassed and the clock from the redisplay module 28 is used as the PVG pixel clock. Only the output stage 30 of the PVG 16 is active during redisplay. The PVG 16 is, in essence, slaved to the redisplay module 14.

Frame Conversion

The RTC 22 and redisplay module 28 write only the active portion of the captured input video into the image store memory 38, because, as noted above, the redisplay module 28 continuously concatenates the active video samples into the largest words that the image store memory 38 can accept in a single write.

Only one frame is stored in the image store memory 38, and it is continuously updated. This occurs at the input video frame rate. For synchronized video, the frame is well-defined. However, for deflection-based video, the frame rate is less well-defined and is determined by the decay rate of the written screen image. This function may be realized in the redisplay module 28 by, for example, a programmable decay rate. As the redisplay module 28 reads the deflection-based video data from the image store memory 38, it is configured to scale it by a decay coefficient and write the scaled data back to the memory. Use of a decay coefficient in accordance with the teachings of the invention is within the purview of one skilled in the art to which this invention pertains.

For either type of video (synchronized video or deflection-based video), the redisplay module 28 continuously reads out the active image at the frame rate of the selected output format. Since write and read processes of the image store memory 38 are independent, the writes to and reads from the image store memory 38 are preferably FIFO-buffered (FIFO being an abbreviation for first-in-first-out) and time division multiplexed by the MAS 42 running at the rate of the fast clock 34. The result is that both the write and read processes act as if each had unfettered access to the image store memory 38. Because the writes to and reads from the image store memory 38 are independent, the input and output frames rates are therefore also independent. Hence, the redisplay module 28 effectively realizes frame rate conversion.

Line Conversion

The number of active lines for synchronized video is well-defined. For deflection-based video, there is no formal definition. The digitized X-Axis and Y-Axis samples of the deflection-based video are utilized as orthogonal vectors into the space of the image store memory 38. The Z-Axis sample constitutes the data written into the image store memory 38. The analog front end of the RTC 22 is preferably programmed so that the Y-axis samples have the same or substantially the same range as the selected redisplay format. For example, if the redisplay output format has 600 active lines, then the Y-Axis digitized samples will have a range of 0 to 599.

During a vertical blanking interval at the start of the redisplay video frame, the redisplay module 28 loads a set of dual port line buffers with the first lines of active video from the RTC image store memory. The actual number of lines transferred depends, for example, on the particular redisplay implementation. The redisplay module 28 uses the line buffers to simultaneously access multiple lines of active video in order to perform line averaging at the rate of the pixel clock 36. During the horizontal blanking portion of each redisplay line, the redisplay module 28 reads a set of parameters generated and stored by the software driver as a function of the input and output formats. These parameters typically include, but are not limited to, the line averaging coefficients and pointers to which, if any, of the line buffers requires updating with a new active video line. Since the line buffers are dual port, the updating takes place at the same time as the buffer is being read out.

For deflection-based video, the number of active lines has already been made equal to the redisplay output format; the operation does not require line averaging. This simplification allows the simulation of screen decay mentioned above in the frame conversion section.

Pixel Conversion

The input video sampling rate is dependent upon whether the input video is analog or digital-based. If the input video is of an analog-type, then the RTC input video sampling rate is set to produce the same number of active pixels per line as the selected redisplay format, in effect resampling the video data during capture. In that case, only the above line averaging by the redisplay module 28 is required.

On the other hand, if the input video is digital, then dynamic pixel averaging is performed so that the resultant number of pixels per line is the same as selected redisplay format. This pixel averaging takes place before the samples are written into the image store memory 38, e.g., in the memory access sequencer 42. In that case, the input pixels are continuously written into a set of (shift) registers 50, see FIG. 3, each of which holds a single pixel. The number of these registers is a function of how many active pixels are in the input video and how many active pixels are to be in the output video. The rate of the sample clock 32 is used to control the writing of the pixels into the registers 50.

In the present embodiment, four registers was determined to be sufficient for some purposes of the invention. Of course, it is envisioned that a different number of registers 50 may be used in the invention without deviating from the scope and spirit thereof.

Figure 3:
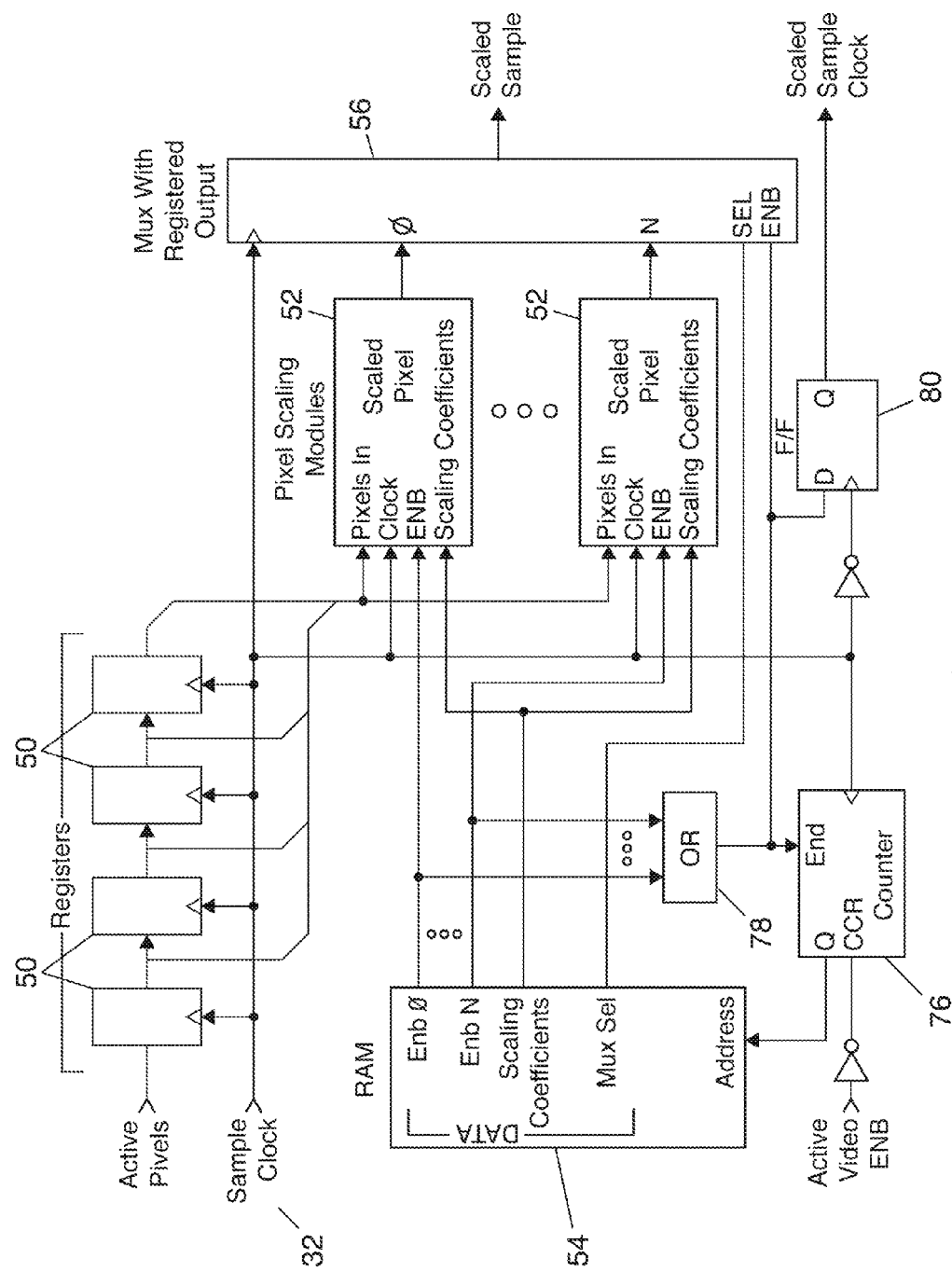
FIG. 3 shows the method for dynamically scaling the number of active pixels from the input number to required output number.
Figure 4:
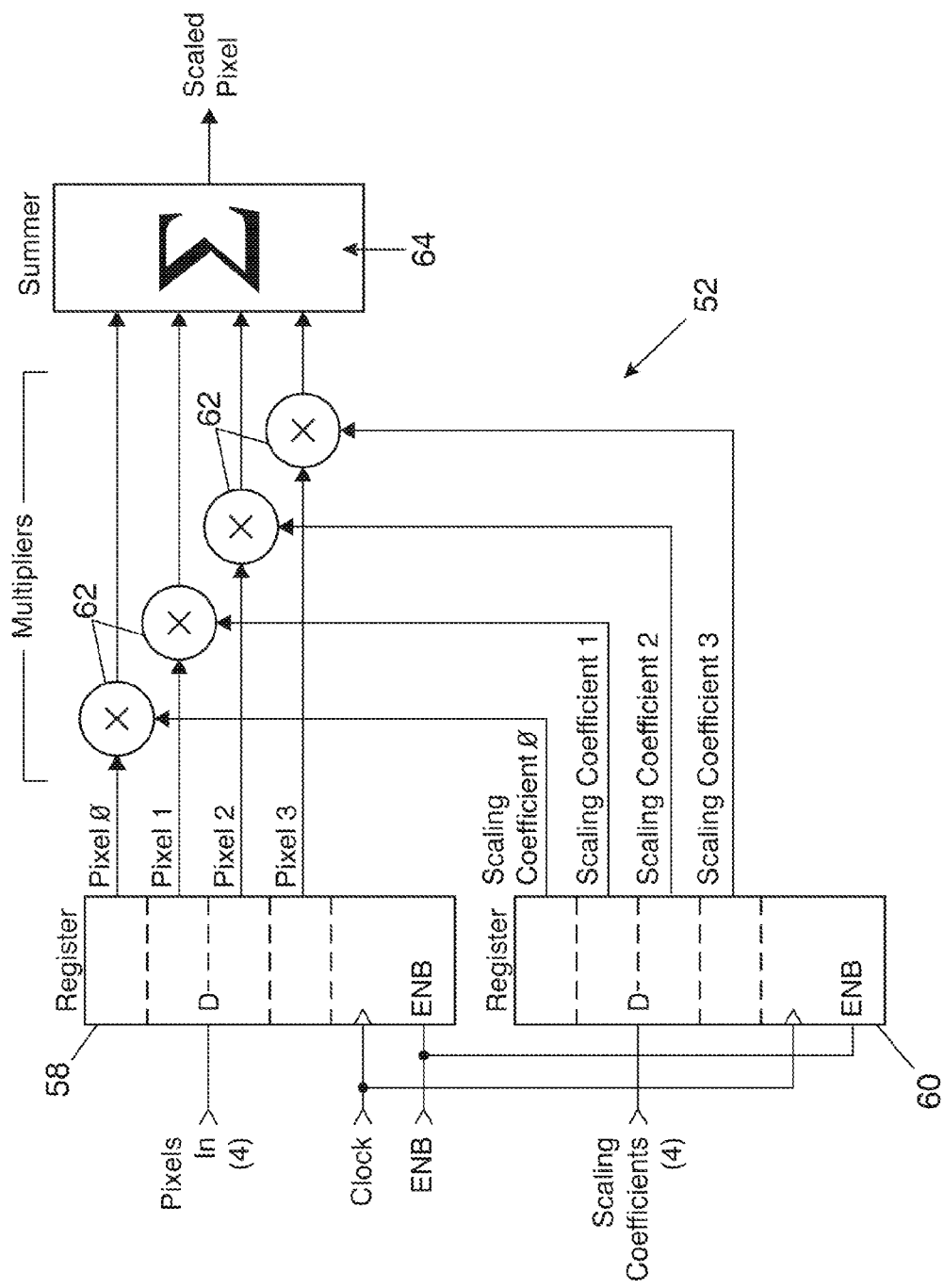
FIG. 4 provides a detailed view of a pixel scaling module used in FIG. 3.

When the set of registers 50 holds the necessary input pixels to be averaged to form the converted pixel, the contents of the shift registers 50 are loaded into one of a plurality of pixel scaling modules 52 (see FIGS. 3 and 4). There is a set of such modules (see FIG. 3), loaded in a round robin fashion, so that there is sufficient time for the averaging process to take place in real-time.

The number of input clock cycles between pixel scaling module 52 loads and the averaging coefficients are held in a local high speed RAM 54 loaded by the driver software (see FIG. 3). Also contained in the RAM 54 is a select value for an output registered multiplexer 56. At the same clock edge that each pixel scaling module 52 is loaded with new pixel data, its output scaled pixel is selected by the multiplexer 56 and registered as the next scaled pixel.

Additional components are shown in FIG. 3, including a counter 76, an OR gate 78 and a flip/flop 80. The connections of these components to the remaining components of the redisplay module 28 are shown in FIG. 3. One skilled in the art would understand how these components function and the purpose thereof in accordance with the invention in view of the presumed knowledge of the general functions of these components, the manner in which they are depicted connecting to other components in FIG. 3 and the disclosure herein.

FIG. 4 shows the interior of a pixel scaling module 52. Each pixel scaling module 52 includes two registers 58, 60. Register 58 receives four pixels from the registers 50, the rate of the rate of the sample clock 32 and ENB from RAM 54, while register 60 receives four scaling coefficients from the RAM 54, the rate of the sample clock 32 and ENB from RAM 54. The pixel values stored in each pixel scaling module 52 are scaled via multipliers 62 and then added by a summer 64 to produce the converted pixel. More specifically, a pixel and a corresponding scaling coefficient, e.g., pixel Ø and scaling coefficient Ø, are provided from the registers 58, 60, respectively, to a respective multiplier 62 and after multiplication of the pixel by the scaling coefficient, to the summer 64. Summer 64 adds the products of each pixel and the corresponding scaling coefficient to produce a scaled pixel. The resultant scaled pixel is provided to the multiplexer 56 (see FIG. 3).

All of the Pixel Scaling Module 52 produce a pulse that advances the RAM 54 to the next data set via a counter used to produce the RAM's address. This same pulse is clocked with the inverted sample clock to produce a scaled sample clock. This methodology works for input active line numbers greater or less than the number of redisplay active lines.

Completing the functionality, the reformatted video data from the redisplay module 28 is streamed to the PVG 16 for signal assembly and generation at the rate of the pixel clock 36. The digital video content data from the redisplay module 28 is selected as the data source for the PVG RGB signal DACs replacing the PVG's normal internal data source. The digital video content data is converted into an analog signal and then amplified and output via the normal PVG channel amplifiers. The discrete digital timing signals from the redisplay module 28 are buffered and output via normal PVG signal buffers. Aside from signal source switching, the PVG 16 operates as it would under normal default conditions. The assembled reformatted signal is available for viewing on a compatible external video monitor.

Figure 5:
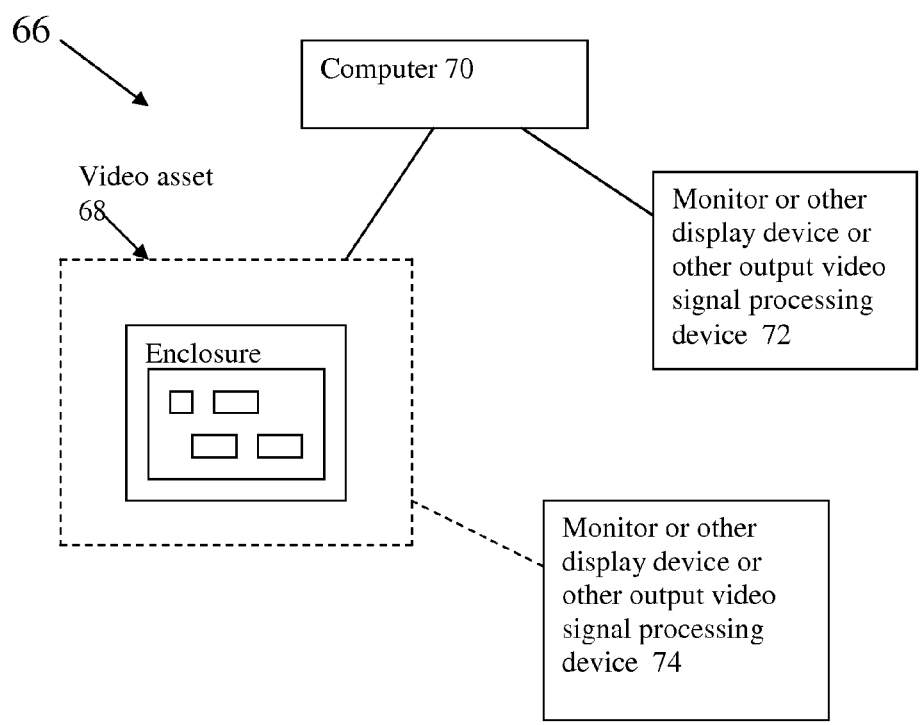
FIG. 5 is a schematic of an exemplifying, non-limiting environment in which the redisplay module in accordance with the invention is used.

Referring now to FIG. 5, the redisplay module 28 described above may be incorporated into a video processing arrangement 66 which includes a video asset 68 and a computer or other comparable processing unit 70 adapted to connect to a monitor or other display device or other output signal processing device 72. Device 72 may be the monitor for the computer 70. Additionally or alternatively, another monitor or other display device or other output signal processing device 74 is connected to the video asset 68. Thus, the video processing arrangement 66 may include two monitors, one associated with the computer 70 and another associated with the video asset 68. It is of course possible to provide a single monitor and connected it to both the video asset 68 and the computer 70.

It is also possible to connect a monitor to one of the video asset 68 and the computer 70 and connect a different display device or an output signal processing device without a display to the other of the video asset 68 and the computer 70. Internal signal processing in the video processing arrangement 66 may be designed to allow output on the monitor and/or on the different display device or output signal processing device without a display, as desired.

Computer 70 may be any processing unit including a processor and appropriate hardware and software to perform usual functions of a computer and functions described herein, e.g., process signals. Couplings between the video asset 68, computer 70, and devices 72, 74 may be any known permanent or temporary connections used in the electronics field.

Basically, the computer 70 generates video signals that can be displayed on the monitor or other display device 72 when connected to the computer 70. Video asset 68 includes at least one enclosure (represented schematically by the outer rectangular box in FIG. 5), at least one circuit board arranged in an interior of the enclosure (represented schematically by the inner rectangular box in FIG. 5), and a plurality of functional modules all arranged on the circuit board(s) in the interior of the enclosure(s) (represented schematically by the small rectangular boxes in FIG. 5). The functional modules includes a composite video module for producing different types of a primary video signal and outputting the primary video signal via output channels (the PVG 16 described above), a real time capture module for capturing video signals in a plurality of different mode (the RTC 14 described above), and a hardware-based redisplay module which links between the composite video module and the real time capture module to form a video reformat/redisplay module (the redisplay module 28 described above).

Video asset 10, 68 may be a VXI register based, single "C" size, instrument intended primarily for use in automatic test equipment. As such, and with reference to FIG. 15 of U.S. Pat. No. 7,978,218, the video asset 10, 68 may be on or housed in a single card designed for insertion into a single slot of the host computer, or more specifically into the chassis of the host computer (the host computer being 12 in FIG. 1 or 70 in FIG. 5). As known to those skilled in the art, such a card would include the necessary hardware to connect to the chassis. The VXI interface 14 on the card is designed to communicate with the host computer 12, 70.

In the arrangement above, the linking of separate and independent video capture and video generation modules results in the creation of a real-time video redisplay (frame conversion) function. Moreover, the independent video capture and video generation modules reside in separate instruments and communicate over VXI, PXI, PXI Express, PCI, USB, or LAN/LXI based communication protocols. Functional operations of video frame conversion, video line conversion and video pixel conversion are optionally combined in order to create a device capable of frame converting and redisplaying video formats in other video formats without regard for the number of video lines in the source video signal or the resultant video signal. For example, frame converting and redisplaying may be performed in analog or digital source video formats, and/or in composite video, raster video or stroke video source formats.

The foregoing invention may be used as alternatives to or in combination with other inventions of the same assignee herein. Some of these inventions are disclosed in U.S. Pat. Nos. 5,179,344, 5,337,014, 5,952,834, 6,057,690, 6,396,536, 6,429,796, 6,502,045, 7,065,466, 7,180,477, 7,253,792, 7,289,159, 7,358,877, 7,495,674, 7,624,379, 7,642,940, 7,683,842, 7,768,533, and 7,978,218, and U.S. patent application Ser. Nos. 11/938,911 filed Nov. 13, 2007, 12/043,183 filed Mar. 6, 2008, 12/687,283 filed Jan. 14, 2010, now abandoned, 12/781,888 filed May 18, 2010, 13/182,063 filed Jul. 13, 2011, 13/237,304 filed Sep. 20, 2011, 13/236,869 filed Sep. 20, 2011, 13/238,588 filed Sep. 21, 2011, 13/303,960 filed Nov. 23, 2011, and 13/324,240 filed Dec. 13, 2011, all of which are incorporated by reference herein.

Having thus described a few particular embodiments of the invention, various alterations, modifications, and improvements will readily occur to those skilled in the art. For instance, the invention can be adapted to redisplay captured video in other video formats. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

What is claimed is:

1. A video processing arrangement, comprising:
a computer adapted to connect to a monitor; and
a video asset coupled to said computer for generating video signals that can be displayed on the monitor when connected to said computer, said video asset comprising:
at least one enclosure;
at least one circuit board arranged in an interior of said at least one enclosure;
a plurality of functional modules, all of said functional modules being arranged on said at least one circuit board in the interior of said at least one enclosure;
a data interface that connects said functional modules together,
said functional modules including:
a composite video module that produces different types of a primary video signal and outputting the primary video signal via output channels,
a real time capture module that captures video signals in a plurality of different modes, and
a redisplay module connected to said composite video module and said real time capture module,
said redisplay module being configured to receive the video signals captured by said real time capture module via said data interface, to process the received video signals captured by said real time capture module and then to direct the processed video signals to said composite video module via said data interface; and
an image store memory connected to said redisplay module that enables bi-directional data flow between said redisplay module and said image store memory,
said redisplay module being further configured to continuously concatenate video signals received from said real time capture module via said data interface into largest samples acceptable by said image store memory in a single write.

2. The arrangement of claim 1, further comprising an interface that connects said video asset to said computer to enable the display of the video signals on the monitor when connected to said computer.

3. The arrangement of claim 1, wherein said video asset is a single instrument adapted for insertion into a single slot of said computer.

4. The arrangement of claim 1, wherein said functional modules further comprise a stroke generator module that generates a stroke XYZ video signal and outputting the stroke video signal via output channels.

5. The arrangement of claim 1, wherein said functional modules further comprise a secondary video source module that produces a secondary composite video signal and outputting the secondary composite video signal via output channels, said secondary video source module being arranged to produce the secondary composite video signal in an identical or different format than the primary video signal and different than the primary video signal.

6. The arrangement of claim 1, further comprising a common distributed time base module that generates and distributes clock signals to all of said functional modules.

7. The arrangement of claim 1, wherein the linking of separate and independent video capture and video generation modules results in the creation of a real-time video redisplay (frame conversion) function, and the independent video capture and video generation modules reside in separate instruments and communicate over VXI, PXI, PXI Express, PCI, USB, or LAN/LXI based communication protocols.

8. The arrangement of claim 1, wherein functional operations of video frame conversion, video line conversion and video pixel conversion are combined in order to create a device capable of frame converting and redisplaying video formats in other video formats without regard for the number of video lines in the source video signal or the resultant video signal.

9. The arrangement of claim 8, wherein frame converting and redisplaying are performed in analog or digital source video formats.

10. The arrangement of claim 8, wherein frame converting and redisplaying are performed in composite video, raster video or stroke video source formats.

11. The arrangement of claim 1, wherein said redisplay module comprises a memory access sequencer coupled to said image store memory and that sequentially receives and stores concatenated samples of the largest size.

12. The arrangement of claim 11, wherein said memory access sequencer is configured to synchronize the concatenated samples to a fast clock and then write the synchronized concatenated samples to said image store memory.

13. The arrangement of claim 11, wherein said redisplay module is further configured to read stored video lines from said image store memory via said memory access sequencer and transfer data representing the stored video lines to a set of active video line buffers.

14. The arrangement of claim 13, wherein said redisplay module further comprises a scaled summer that reads data simultaneously from said set of active video line buffers and performs line averaging to achieve a same number of active lines as a selected redisplay format.

15. The arrangement of claim 1, wherein said image store memory is organized as lines of pixels such that input video lines are stored in said image store memory in an order in which they are redisplayed.

16. The arrangement of claim 1, wherein said redisplay module is further configured to generate timing signals associated with a selected output format of video from said composite video module and direct, via said data interface, the generated timing signals to said composite video module.

17. The arrangement of claim 16, wherein said redisplay module is further configured to generate the timing signals from an input rate of a pixel clock.

18. The arrangement of claim 1, wherein said composite video module is clocked by a common clock with said redisplay module.

19. The arrangement of claim 1, wherein said real time capture module is independent and separate from said composite video module, said redisplay module being interposed in a signal path between said real time capture module and said composite video module.

* * * * *